Figures 10, 11:
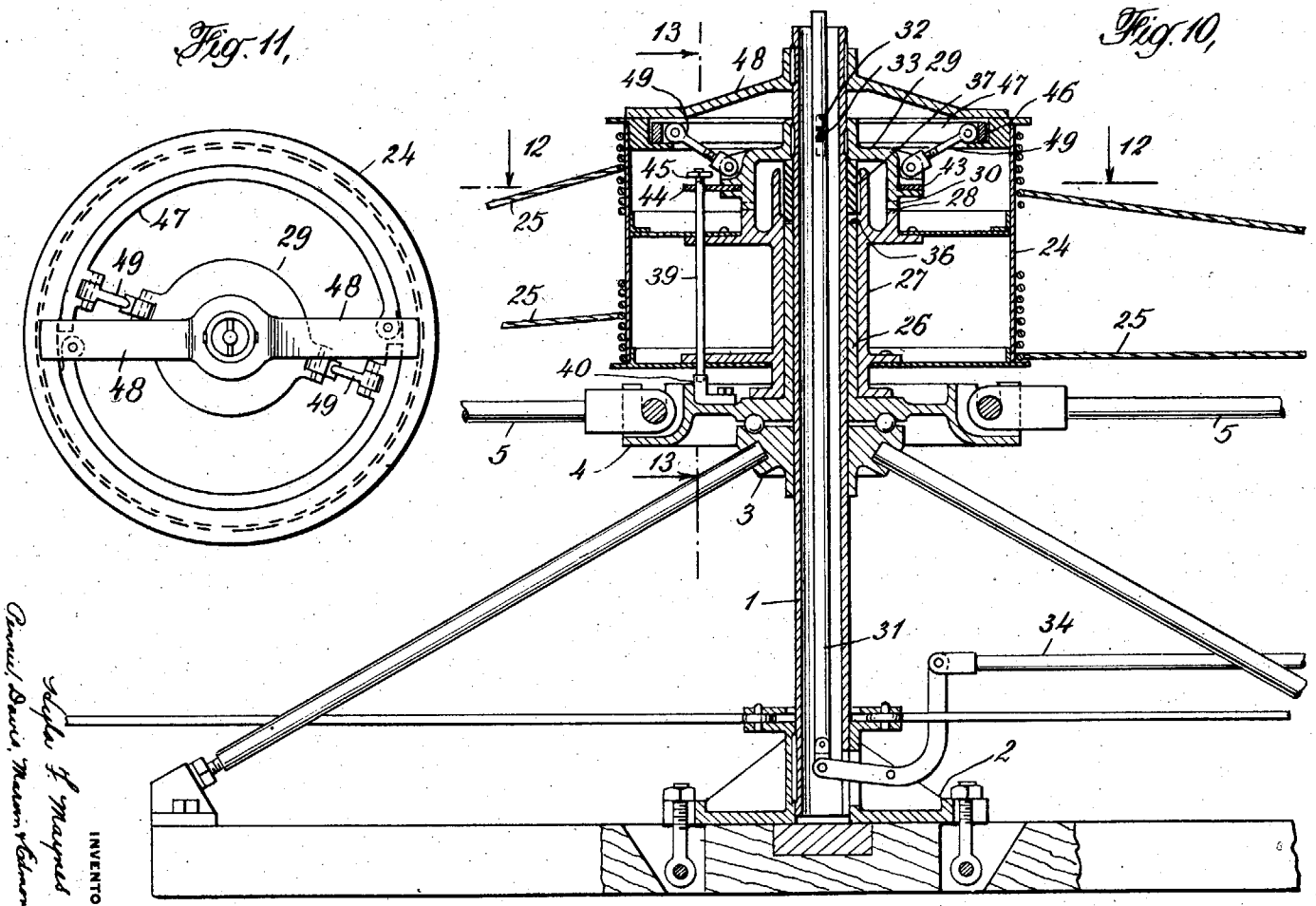

March 8, 1927. Re. 16,569
H. F. MAYNES
AMUSEMENT RIDE
Original Filed Dec. 18, 1922 6 Sheets-Sheet 1
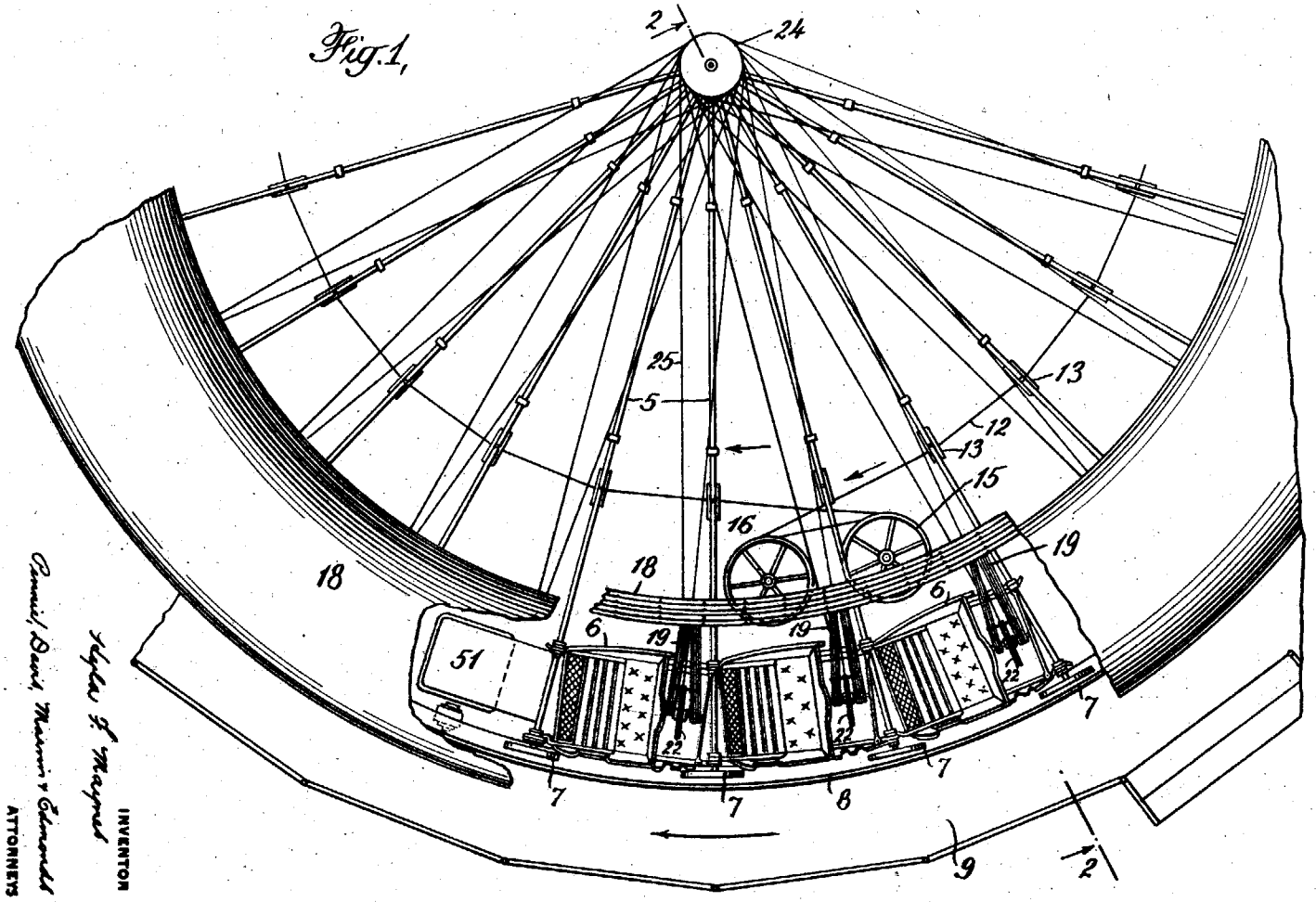
INVENTOR
Sylvester F. Maynes
Pennie, Davis, Marvin & Edmonds
ATTORNEYS March 8, 1927. Re. 16,569
H. F. MAYNES
AMUSEMENT RIDE
Original Filed Dec. 18, 1922 6 Sheets-Sheet 2
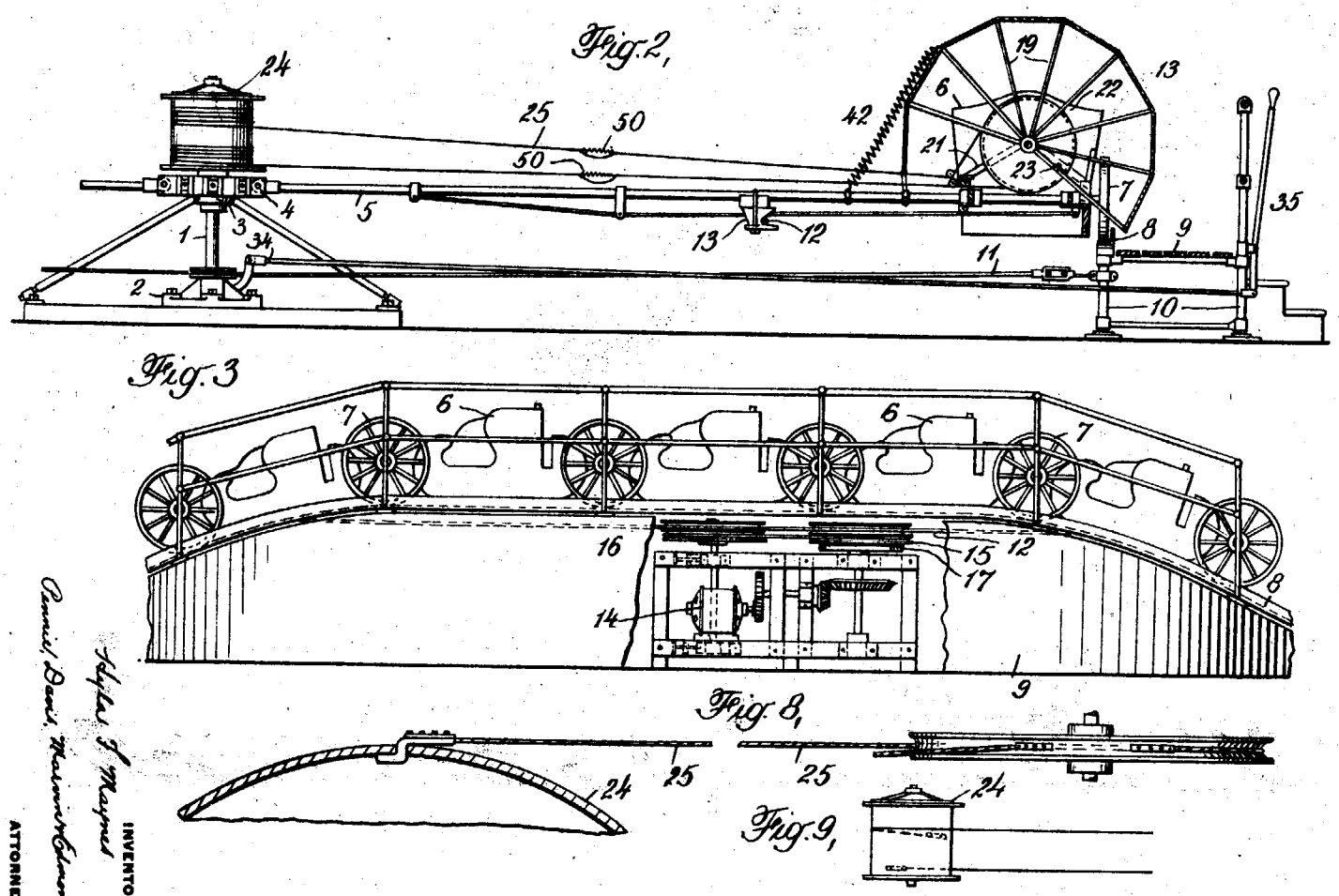
INVENTOR
Hylas F. Maynes
Pennie, Davis, Marvin & Edmonds
ATTORNEYS March 8, 1927. H. F. MAYNES Re. 16,569
AMUSEMENT RIDE
Original Filed Dec. 18, 1922 6 Sheets-Sheet 3
Fig. 4,
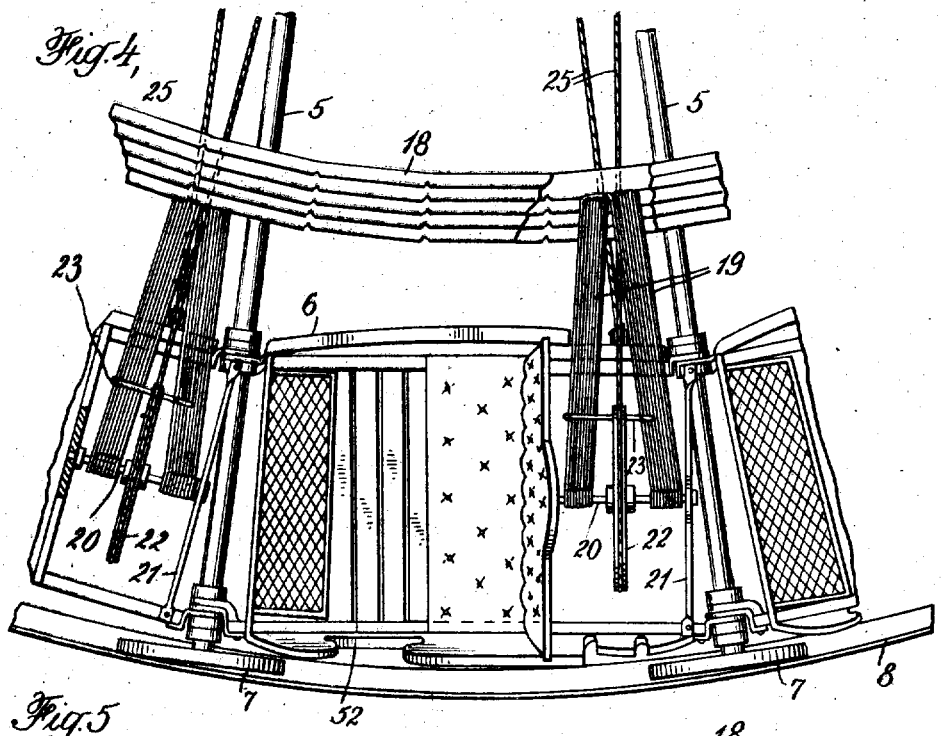
Fig. 5
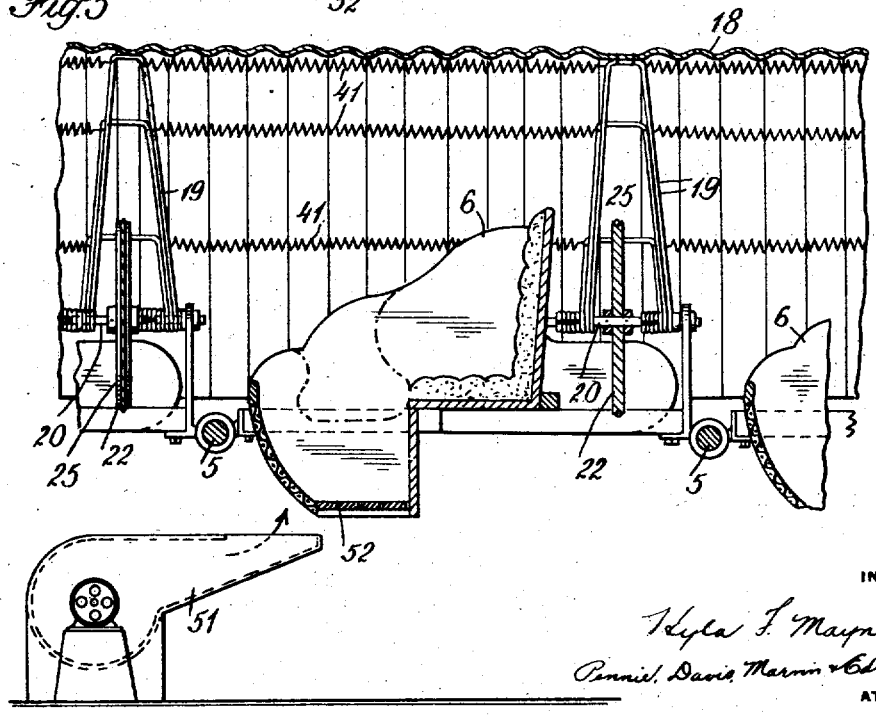
INVENTOR
Hyla F. Maynes
Pennie, Davis, Marvin & Edmonds
ATTORNEYS March 8, 1927. Re. 16,569
H. F. MAYNES
AMUSEMENT RIDE
Original Filed Dec. 18, 1922 6 Sheets-Sheet 4
Fig. 6,
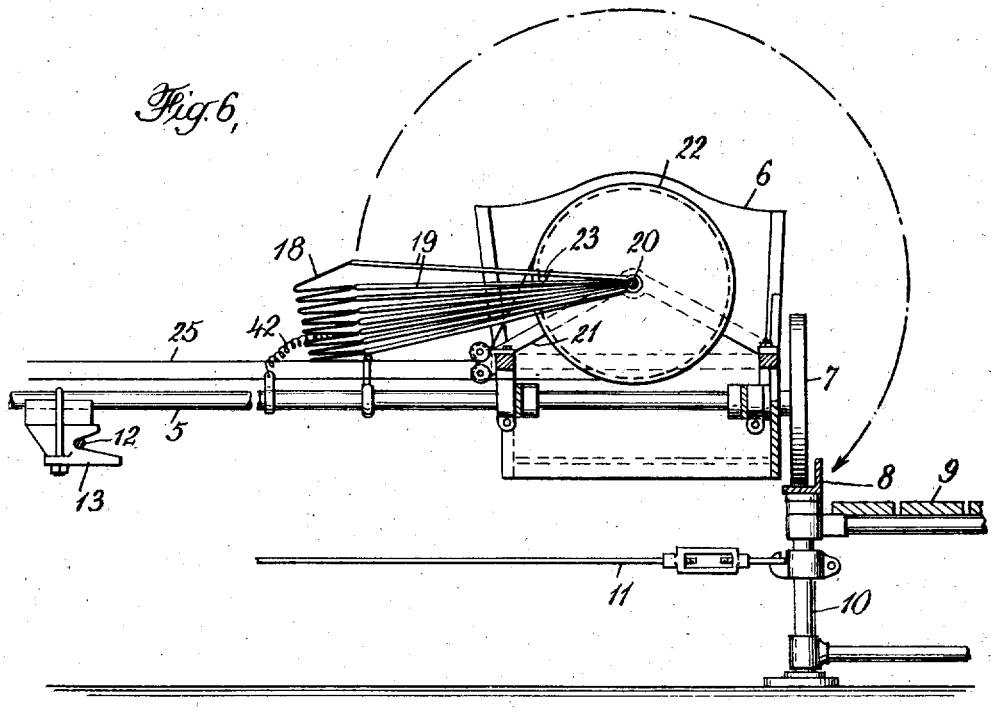
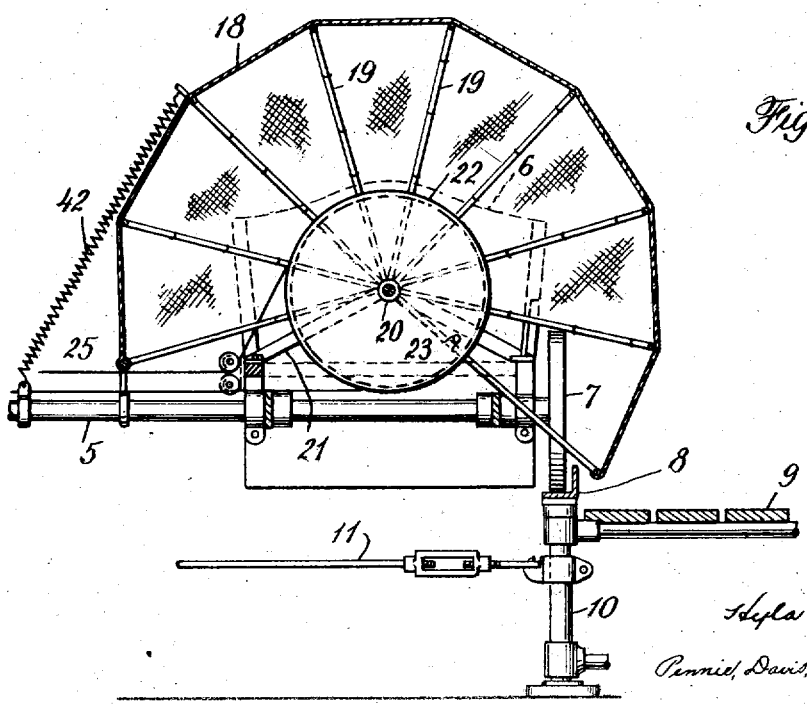
Fig. 7,
INVENTOR
Hayla F. Maynes
Pennie, Davis, Marvin & Edmonds
ATTORNEYS March 8, 1927. Re. 16,569

H. F. MAYNES

AMUSEMENT RIDE

Original Filed Dec. 18, 1922 6 Sheets-Sheet 5

INVENTOR

Hyla F. Maynes

Pennie, Davis, Marvin & Edmonds

ATTORNEYS

March 8, 1927. H. F. MAYNES Re. 16,569
AMUSEMENT RIDE
Original Filed Dec. 18, 1922 6 Sheets-Sheet 6
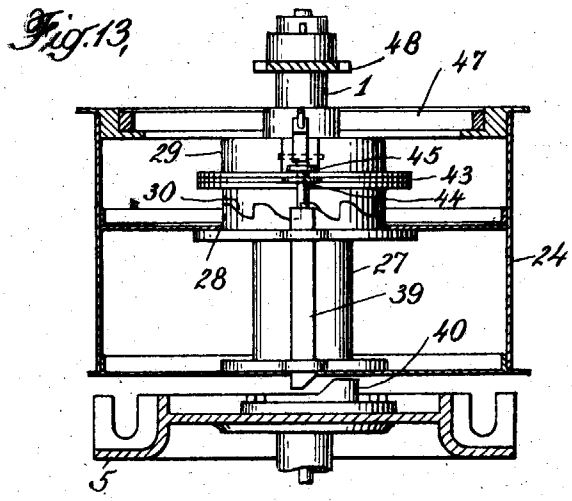
Fig. 13,
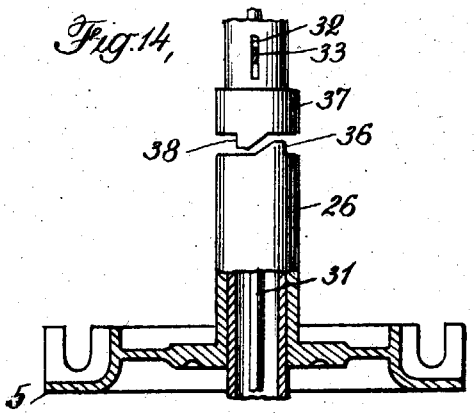
Fig. 14,
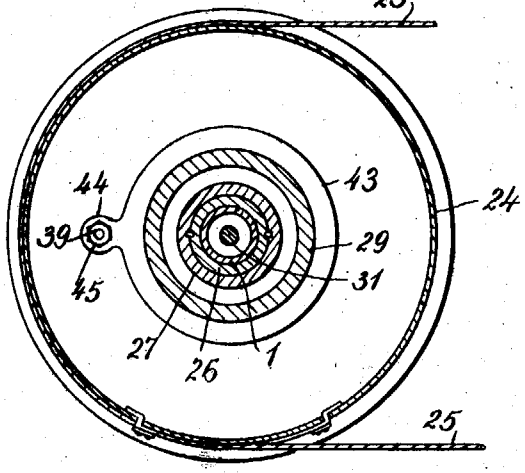
Fig. 12,
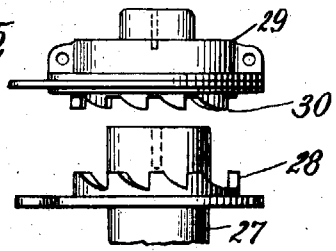
Fig. 15,
INVENTOR
Hayla F. Maynes
Pennie, Davis, Marvin & Edmonds
ATTORNEYS Patented Mar. 8, 1927. Re. 16,569

UNITED STATES PATENT OFFICE.

HYLA F. MAYNES, OF NORTH TONAWANDA, NEW YORK, ASSIGNOR, BY DIRECT AND MESNE ASSIGNMENTS, TO MAYNES CORPORATION, OF DOVER, DELAWARE, A CORPORATION OF DELAWARE.

AMUSEMENT RIDE.

Original No. 1,501,613, dated July 15, 1924, Serial No. 607,522, filed December 18, 1922. Application for reissue filed December 18, 1926. Serial No. 155,731.

This invention relates to an amusement ride of the type in which cars and passengers are alternately hidden from and exposed to view during the ride by means of a collapsible canopy or equivalent means. Such a ride is described in my Patent No. 1,439,478, December 19, 1922. The object of the present invention is generally to improve such rides, particularly those of the merry-go-round type. One improvement lies in the provision of a new canopy operating mechanism, so designed that the movement of the ride itself is utilized to operate the canopy, thus doing away with the necessity of a separate source of power and simplifying the control. Another improvement lies in the provision of means for automatically rendering the canopy operating mechanism inoperative when the canopy has reached the concealing position. Another improvement lies in the provision of a new drive for the ride.

The ride illustrated in my Patent No. 1,439,478 is provided with a fixed vertical central axis about which passenger-carrying cars revolve, sweeps radiating outwardly and carrying the cars, an undulating trackway upon which the cars run, and a canopy normally lying in folded position adjacent the cars designed to be unfolded to conceal the cars and their passengers from spectators. This canopy is unfolded by means of a motor situated at the center of the ride. To unfold the canopy in accordance with the present invention I provide a series of cables extending from the canopy and winding about a central drum coaxial with the ride and normally rotating with it. No separate source of power is required to rotate this drum and unfold the canopy. When the canopy is to be unfolded rotation of the drum is arrested long enough to permit the cables carried by the still revolving cars to wind about it and pull the canopy into unfolded position. When this position has been reached the drum is automatically released and permitted to continue its rotation with the ride, but latched against reverse movement. Springs return the canopy to folded position when the holding latch on the drum is released.

The accompanying drawings disclose a preferred embodiment of my invention and a study of them will make clear the principles involved. In these drawings, Figure 1 is a plan view of part of a merry-go-round ride constructed and equipped in accordance with the present invention, showing the general relation of the parts, Figure 2 is a vertical transverse section through part of the ride showing the canopy in unfolded position covering the cars and also showing the relation of the drum to the canopy, Figure 3 is an elevation of one of the hills of the ride showing the position of the driving mechanism, Figure 4 is a view similar to Figure 1 but on a larger scale and showing in greater detail the canopy collapsing mechanism in folded position, Figure 5 is a vertical longitudinal section through the cars and canopy showing the canopy in concealing position over the cars and also showing the position of one of the blowers used in connection with the ride, Figure 6 is an enlarged transverse section similar to Figure 2 but showing the canopy in folded position, Figure 7 is a view similar to Figure 6 showing the canopy in unfolded or concealing position, Figure 8 is a detail showing the manner in which the operating cables are connected to the drum and the canopy operating sheave, Figure 9 is a detail showing the manner in which these cables are wound about the drum, Figure 10 is an enlarged vertical section through the central stand pipe, the sweep spider, the drum and the clutch mechanism, Figure 11 is a plan view of the drum, Figure 12 is a section taken along line 12—12 of Figure 10, Figure 13 is a vertical section through the drum similar to Figure 10 but showing the clutch mechanism in elevation, Figure 14 is an elevation partly in section showing the clutch release cams, and Figure 15 is a detail of the clutch members.

The merry-go-round ride shown in these drawings comprises a central stand pipe 1 fixedly mounted upon a suitable base or standard 2 and acting as a pivot or axis for the ride. Upon this stand pipe is fixed a thrust bearing 3 upon which rotates a sweep spider 4 to which are pivotally connected for swinging movement in a vertical plane a series of radial sweeps 5. Pivoted to the outer ends of these sweeps is a train of cars 6, each car being supported by two sweeps as clearly shown. At the outer end of each sweep is mounted a wheel 7 running upon an undulating trackway 8, these wheels supporting the weight of the cars. Beyond this trackway is situated a loading platform 9 which follows the undulations on the trackway and encircles the ride. Both trackway and platform are supported upon suitable standards 10 and held in place relative to the central stand pipe by means of tie rods 11.

This ride is driven by means of a cable 12 which encircles it and makes driving contact therewith through a series of cable guides 13 one secured to the lower side of each sweep. One of the hills of the ride is slightly flattened as shown in Figure 8 and at this point is situated the driving mechanism comprising a motor 14, a driving or power sheave 15 driven through suitable reducing gearing as shown and an idler sheave 16. The cable upon leaving the last cable guide block passes about the idler sheave for half a turn, then about the driving sheave, again about the idler sheave then about the driving sheave once more and thence back to the guide blocks. The cable is delivered to the sheave 16 in the plane of that sheave, and is delivered from the sheave 15 to the guide blocks in the plane of the two effective guide blocks immediately adjacent that sheave. Beneath the driving sheave 15 and affixed thereto is a brake drum 17 upon which the brakes are applied when the ride is to be stopped. By arranging the two pulleys in relation to the drive as shown, when the brakes are applied through brake drum 17 the greatest strain comes on the driving sheave and hence the action of the brake is more effective than it would be with the starting strain borne by the driving sheave.

Having now described the general construction of the merry-go-round and the manner in which it is driven I shall now turn to a description of the canopy and its operating mechanism. The canopy itself 18 is best shown in Figures 1, 2, 4, 5, 6, and 7 to which attention is now called. Normally this canopy lies in folded position between the cars and the central axis. When in unfolded position it covers the cars and is supported upon a series of fanlike supports 19 each set being journaled upon a rod 20 extending from the back of the seat of each car and supported at its other end by means of a V-shaped standard 21 supported upon the cars. These fanlike supports are U-shaped as shown and are secured to the canopy at their closed ends, their other ends being journaled upon the rod 20. Likewise journaled upon each rod 20 between the ends of the fanlike supports is a sheave 22 provided with a pin 23 extending through it near its periphery and designed to connect with the upper of the supports 19 as is shown most clearly in Figures 6 and 7. It is thus clear that clockwise rotation of this sheave 22 will unfold the canopy from the position shown in Figure 6 until it encloses the cars as shown in Figure 7. It next remains to consider the means for effecting this partial rotation of sheave 22 in order to effect this unfolding movement of the canopy.

Returning to Figure 1 it will be seen that there is there illustrated a central drum 24 about which pass a series of cables 25 which radiate outwardly and pass about the sheaves 22. Therefore by proper relative rotation of this drum 24 the sheaves 22 can be rotated to effect the proper unfolding of the canopy, but in accordance with the present invention this relative movement is produced by simply arresting the normal rotation of the drum with the ride and holding it fixed for a short time sufficient to permit the cables to wind about it and unfold the canopy. This unfolding action will be clear from a study of Figures 2, 8 and 9. When the drum 24 ceases to rotate while the ride itself moves on in clockwise rotation, the lower runs of the cables 25 begin to wind clockwise about the drum, this resulting in the necessary pull upon the sheave 22 to rotate it. It is clear, however, that unless some means were provided for disengaging the cables or releasing the drum so that it might again rotate with the ride something would break when the canopy reaches its completely unfolded position. The mechanism for arresting the rotation of the drum and automatically permitting it again to rotate when the canopy has been unfolded is shown most clearly in Figures 2, 10, 11, 12, 13, 14 and 15 to which attention is now called.

Integral with the sweep spider 4 and journaled upon the stand pipe 1 is a sleeve 26, and upon this sleeve is journaled the drum barrel 27. The upper end of this drum barrel is provided with ratchet teeth 28 the function of which will be described later. Above the upper end of the drum barrel but within the drum a clutch member 29 is mounted upon the stand pipe and keyed thereto so that it can be slid vertically but cannot be rotated. The lower face of this clutch member is provided with ratchet teeth 30 which correspond with and are used to engage ratchet teeth 28 on the drum barrel. Within the stand pipe is mounted a plunger rod 31 keyed directly to the clutch member 29, slot 32 being provided in the stand pipe to allow for vertical movement of the plunger rod and its key 33 therein. This plunger rod 31 is reciprocated by means of suitable link-work 34 which terminates in a lever 35 pivoted on the loading platform as shown in Figure 2.

Clutch member 29 is normally raised to such a point that the ratchet teeth 28 and 30 are out of engagement. When in this position it is clear that the drum is free to rotate in unison with the sweep spider, the cables 25 causing it to rotate with the ride. Through movement of the lever 35, however, this clutch member can be lowered so that the ratchet teeth engage, and as clutch member 29 itself cannot rotate but is fixed upon the stand pipe, the drum barrel thereupon becomes locked and rotation of the drum ceases with the consequent winding up of the cables and the unfolding of the canopy.

Release of the drum is effected by the following mechanism. The upper end of sleeve 26 is provided with a cam 36 shown most clearly in Figure 14. Journaled upon the stand pipe just above the upper end of the sleeve 26 and keyed to the drum barrel so that it can move longitudinally relatively thereto but cannot rotate except with the drum barrel, is a cam collar 37 likewise provided with a cam 38 designed to co-operate with the cam 36. The upper end of this cam collar 37 abuts against the clutch member 29 as shown in Figure 10. Now the cam 36 is so positioned that continued rotation of the sweep spider after the arrest of the drum causes it to engage cam 38, raise cam collar 37 and disengage the clutch member just as the canopy reaches its completely unfolded position. When the clutch members are disengaged the drum, of course, is free to continue its rotation with the ride.

It is necessary at this point, however, to provide some latch preventing reverse rotation of the drum due to action of the canopy returning springs which will be described later. Accordingly I provide a latch link 39 mounted within the drum for vertical movement and engaging with a dog 40 situated upon the upper face of the spider. This dog is so positioned relative to the cam 36 that the latch link 39 has just ridden over it when the cam 36 co-operating with the cam collar 37 has disengaged the clutch members. The canopy is now unfolded over the cars and the ride is going merrily on. Let us now consider the mechanism designed to return the canopy to its folded position.

The outer ends of the various members of the groups of fanlike supports 19 are connected by means of coil springs 41. These springs perform two functions. They bear against the walls of the canopy and support them between supports and they also serve to return the canopy to its folded position. It will be clear from a consideration of the nature of this ride that when the canopy is unfolded its springs are extended and hence placed under tension. There is therefore a constant tendency for them to contract and return the canopy to its original position. I have also provided auxiliary springs 42 extending from one of the inner fanlike supports to the sweeps, these springs acting to initiate the return movement. But as long as the latch link 39 abuts against the latch dog 40 this return movement of the canopy is impossible.

In order to disengage the latch link from the dog I have provided the following mechanism. An annular ring 43 is rotatably mounted upon the clutch member 29, this ring being provided with a projecting eye 44 through which the upper end of the latch link loosely extends. The extreme upper end of the latch link is provided with a nut 45. To release the latch link it is only necessary to reverse the movement of lever 35 which moves the plunger rod 31 upwardly, and this raises the clutch member 29 and ring 43 until the eye 44 engages the nut 45 and raises the latch. At this moment the return springs 41 and 42 act to fold the canopy, the restraint imposed by the lower runs of cables 25 being thus removed.

In order to prevent the too sudden return of the canopy and to prevent its slamming into folded position I have provided a brake consisting of a brake drum 46 within the upper end of the winding drum and a co-operating expansible brakeband 47 pivoted upon and supported by arms 48 keyed to the stand pipe and operating through toggles 49 mounted upon the clutch member 29. Thus, as the lever 35 is moved to disengage the latch, continued movement will apply the brake and allow the canopy to gently return to rest.

It sometimes happens, due to the undulatory nature of the ride and perhaps to various other causes, that the return springs do not act upon the entire circumference of the canopy and return it to folded position all at the same time, some of the springs acting quickly and others lagging in their action. In order to distribute the force exerted by these springs I have employed additional cables 25 which are wound about the drum 24 in a direction opposite that in which the unfolding cables are wound. These cables now under discussion form in effect the upper runs of cable 25 and they serve through the reverse rotation of drum 24 to exert a pull upon the lagging sections of the canopy and thus equalize the forces exerted by the springs.

Within these cables 25 I have interposed yielding or spring sections 50 which serve to keep the cables taut at all times and prevent their jumping out of place during the folding or unfolding of the canopy. These springs also allow for slight variations in the lengths of the cables as the cars pass up and down the undulations.

In order to add to the interest and excitement of the ride I may provide a series of blowers 51 situated at intervals around the trackway and designed to blow sudden blasts of air upwardly through a foraminous or slotted floor 52 with which the cars are provided. The canopy may also be provided with partitions such as shown in Figure 7 dividing the enclosure into a series of small compartments or these partitions can be omitted and the entire train enclosed in a seeming tunnel.

The operation of the ride may be briefly reviewed as follows. The canopy lying in folded position between the cars and the central pivot, the passengers readily enter the cars from the loading platform as is common in merry-go-round rides. The passengers being seated the ride is started through motor 14 and soon gets up to speed. Meanwhile the drum 24 is rotating with the cars and the canopy remains in folded position. Suddenly the operator moves the lever 35 outwardly thus lowering clutch member 29 so that the ratchet teeth 30 engage ratchet teeth 28 and arrest the rotation of the drum. The lower runs of cables 25 immediately begin to wind up and the canopy is thrown over the cars by the continued rotation of the ride itself. This continued rotation brings the cam 36 into engagement with the cam 38 and raises cam collar 37 to disengage the clutch members, this disengagement being effected after the ride has rotated through about five-eighths of a full circle. At the same time latch link 39 has fallen behind latch dog 40 and the drum although free to rotate with the ride cannot reverse under the impetus of springs 41 and 42. At this point the blowers 51 may be operated. In order to add to the general merriment it now becomes necessary to raise the canopy and this is done by reversing the movement of lever 35 which has meanwhile been returned to its initial position through the action of the cam collar 37, clutch member 29 and plunger rod 31. This reverse movement of the lever 35 raises the clutch member 29 until the eye 44 of the ring 43 disengages the latch from the latch dog. The springs 41 and 42 are thus free to return the canopy to its folded position and the too speedy return is avoided by means of the co-operation of brake band 47 and the brake drum 46. This unfolding and folding operation is repeated a number of times throughout the duration of the ride and, needless to say, the operating mechanism must be reliable and always under the immediate control of the operator. This has been found true of mechanism constructed and operated in accordance with the present invention.

I claim:

1. In an amusement ride having a traveling passenger car or train, the combination with the car or train of a canopy adapted to be moved into concealing position between the car or train and spectators, means for moving the canopy during the ride into concealing position, and means for connecting the moving car or train with the canopy moving means.

2. An amusement apparatus comprising the combination of a car or train revolving about a central pivot, a radially folding canopy normally lying in folded position between the car or train and the pivot and adapted to be interposed between the car or train and spectators, means for moving the canopy into concealing position during the ride, and means for connecting the moving car or train with the canopy moving means.

3. In an amusement ride of the merry-go-round type, having a traveling passenger car or train, the combination with the car or train of a canopy traveling therewith and adapted to be moved into concealing position between the car or train and spectators, means for moving the canopy into concealing position during the ride, and means for connecting the moving car or train with the canopy moving means.

4. In an amusement apparatus having a passenger car or train, the combination with the car or train of a folding canopy adapted to enfold the car or train, means for moving the canopy into unfolded position, means for connecting the car or train with the canopy moving means, means for holding the canopy in unfolded position, and means for automatically folding the canopy when the holding means cease to act.

5. In an amusement ride having a traveling passenger car or train, the combination with the car or train of a folding canopy carried thereby, and adapted to fold and unfold transversely of the path of movement of the car or train, means for positively unfolding the canopy over the car or train, means for holding it in the unfolded position, means for automatically folding the canopy when the holding means cease to act, and braking means opposing the action of the automatic return means preventing a sudden return of the canopy to folded position.

6. An amusement ride of the merry-go-round type, comprising the combination of a car or train revolving about a central pivot, a folding canopy normally lying in folded position at one side of the path of movement of the car or train, a rotatable drum coaxial with the ride, cables connecting the drum and the canopy, and means for relating the movement of the car or train to that of the drum so that the movement of the car or train relative to the drum causes the cables to wind around the drum and unfold the canopy.

7. An amusement ride of the merry-go-round type, comprising the combination of a car or train revolving about a central pivot, a radially folding canopy carried by the car or train and normally lying in folded position between the car or train and the pivot and adapted to enfold the car or train, a rotatable drum mounted for rotation about the pivot and normally rotatable with the cars, cables connecting the drum and the canopy, and means for arresting rotation of the drum while the car or train continues to revolve, whereby the continued movement of the car or train causes the cables to wind upon the drum and unfold the canopy over the car or train.

8. An amusement ride of the merry-go-round type, comprising the combination of a car or train, revolving about a central pivot, a radially folding canopy carried by the car or train and normally lying in folded position between the car or train and the pivot and adapted to enfold the car or train, a rotatable drum mounted for rotation about the pivot and normally rotatable with the cars, cables connecting the drum and the canopy, means for arresting rotation of the drum while the car or train continues to revolve, whereby the continued movement of the car or train causes the cables to wind upon the drum and unfold the canopy over the car or train, means for disengaging the arresting means when the canopy has been folded over the car or train, and means for holding the drum in fixed relation to the cars when the canopy is in unfolded position.

9. An amusement ride of the merry-go-round type, comprising the combination of a car or train, revolving about a central pivot, a radially folding canopy carried by the car or train and normally lying in folded position between the car or train and the pivot and adapted to enfold the car or train, a rotatable drum mounted for rotation about the pivot and normally rotatable with the cars, cables connecting the drum and the canopy, means for arresting rotation of the drum while the car or train continues to revolve, whereby the continued movement of the car or train causes the cables to wind upon the drum and unfold the canopy over the car or train, means for disengaging the arresting means when the canopy has been folded over the car or train, means for holding the drum in fixed relation to the cars when the canopy is in unfolded position, means for disengaging the drum holding means and automatic means for returning the canopy to folded position.

10. An amusement ride of the mery-go-round type, comprising the combination of a car or train, revolving about a central pivot, a radially folding canopy carried by the car or train and normally lying in folded position between the car or train and the pivot and adapted to enfold the car or train a rotatable drum mounted for rotation about the pivot and normally rotatable with the cars, cables connecting the drum and the canopy, means for arresting rotation of the drum while the car or train continues to revolve whereby the continued movement of the car or train causes the cables to wind upon the drum and unfold the canopy over the car or train, means for disengaging the arresting means when the canopy has been folded over the car or train, means for holding the drum in fixed relation to the cars when the canopy is in unfolded position, means for disengaging the drum holding means, automatic means for returning the canopy to folded position, and a brake for preventing rapid counter-rotation of the drum during the folding movement of the canopy.

11. In an amusement ride of the merry-go-round type, having a traveling passenger car or train revolving about a fixed central stand pipe, the combination of a folding canopy normally lying in folded position at one side of the car or train and adapted to be folded over it, a drum coaxial with the stand pipe and normally rotatable with the ride, a cable extending from the drum to the canopy for unfolding the latter, a clutch member on the drum, a non-rotatable co-operating clutch member on the stand pipe, and means for throwing the clutch members into engagement during the ride to arrest the rotation of the drum, whereupon the continued movement of the car or train winds the cable about the drum and unfolds the canopy.

12. An amusement ride of the merry-go-round type, comprising the combination of a central fixed axis, a sweep spider journaled thereon, sweeps extending radially from the spider, passenger cars at the outer ends of the sweeps, a folding canopy carried by the cars and adapted to enclose them but normally lying in folded position at one side, a drum journaled upon the vertical axis and normally rotatable with the sweep spider, cables connecting the drum and the canopy, a clutch member on the drum, a non-rotatable vertically slideable co-operating clutch member keyed on the axis, means for throwing the clutch members into engagement during the ride to arrest the rotation of the drum, whereby the continued rotation of the spider sweeps, and cars, winds the cable about the drum and unfolds the canopy, a cam carried by the spider, and a non-rotatable vertically slideable cam collar keyed on the axis bearing against the movable clutch member and co-operating with the cam carried by the sweep spider to raise the clutch member and disengage the clutch.

13. The combination with the mechanism claimed in claim 12 of automatic means for folding the canopy, a latch carried by the drum, and a dog on the spider co-operating with the latch to prevent reverse rotation of the drum when the clutch members are released.

14. The combination with the mechanism claimed in claim 12 of automatic means for folding the canopy, a brake band co-operating wtih the drum and actuated by upward movement of the slideable clutch member for preventing sudden return of the canopy to unfolded position.

15. An amusement ride of the merry-go-round type, comprising the combination of cars mounted to revolve in a vertically undulating path about a fixed pivot, a normally folded canopy carried by the cars and adapted to enfold them, a drum coaxial with the pivot and normally rotatable with the ride, cables connecting the drum and the canopy, means for arresting the rotation of the drum while the cars continue to revolve whereby the continued movement of the cars winds the cables upon the drum and unfolds the canopy, and springs in the cables for holding them taut.

16. An amusement ride of the merry-go-round type, comprising the combination of cars mounted to revolve about a fixed pivot, a normally folded canopy carried by the cars and adapted to enfold them, a drum co-axial with the pivot and normally rotatable with the ride, cables winding upon the drum and connected with the canopy, part of the cables being wound about the drum in one direction and part in the other, means for arresting the rotation of the drum during the ride, whereupon the continued rotation of the ride winds part of the cables upon the drum and unfolds the canopy while unwinding the other cables, springs for returning the canopy to the folded position and reversing the rotation of the drum, the rewinding of the cables unwound during the unfolding movement distributing the force of the springs and folding the entire canopy at one time.

17. An amusement ride of the merry-go-round type, comprising the combination of cars designed to revolve about a fixed pivot, a normally folded canopy carried by the cars, means for unfolding the canopy to conceal the cars, means for folding the canopy, and means for distributing the force exerted by the folding means so that the entire canopy folds at one time.

18. In an amusement ride of the merry-go-round type having cars revolving about a central axis, the combination of a canopy adapted to conceal the cars, a drum coaxial with the ride and normally rotatable therewith, cables extending from the drum to the canopy, a clutch for arresting the rotation of the drum so that continued rotation of the ride causes the cables to wind upon the drum and unfold the canopy, springs operating to return the canopy to folded position, means for automatically disengaging the clutch when the canopy is unfolded, a latch holding the drum against reverse movement when the clutch is disengaged, a brake for preventing rapid reverse rotation of the drum, a linkwork for throwing the clutch members into engagement and for disengaging the latch and applying the brake.

19. In an amusement ride having a traveling passenger car or train, the combination with the car or train of a canopy adapted to be interposed between the car or train and the spectators, means for moving the canopy during the ride into concealing position, and means for automatically rendering the moving means inoperative when the canopy has been moved into concealing position.

20. In an amusement ride having a traveling passenger car or train, the combination with the car or train of a canopy adapted to enclose the car or train and normally lying in closed position at one side of the path of travel, means for unfolding the canopy over the cars, and means for automatically arresting the unfolding movement when the car or train has been enclosed.

21. In an amusement ride of the merry-go-round type having cars revolving about a central pivot, the combination of a canopy adapted to enclose the cars and normally lying in folded position at one side of the path of travel, means for unfolding the canopy over the cars, means for automatically rendering the unfolding means inoperative when the canopy is unfolded, means for holding the canopy in unfolded position and means for folding the canopy.

22. In an amusement apparatus having a passenger car or train, the combination with the car or train of a folding canopy adapted to enfold the car or train, means actuated by the movement of the car or train for moving the canopy into unfolded position, means for rendering the unfolding means inoperative when the canopy is unfolded, means for holding the canopy in unfolded position and means for automatically folding the canopy when the holding means cease to act.

23. In an amusement ride having a traveling passenger car or train, the combination with the car or train of a folding canopy normally lying in folded position lengthwise of the car or train and to one side thereof, fanlike supports for the canopy pivoted on the car or train, a sheave likewise pivoted on the car or train coaxial with the fanlike supports and movable with said supports, and a cable fastened to each sheave through which force is exerted to open the fanlike supports.

24. An amusement ride comprising the combination of a central axis, sweeps radiating therefrom, cars at the outer ends of the sweeps, an undulating trackway upon which the cars run, cable guides secured to the sweeps and undulating therewith, a cable in said guides, and means for pulling upon the cable to rotate the ride.

25. An amusement ride of the merry-go-round type, comprising the combination of a rotating car support, a cable guide on said support, an endless cable in said guide for rotating the support, a driving sheave, and an idler sheave, the cable passing from the cable guide around the idler sheave thence around the driving sheave, thence around the idler sheave again and thence around the driving sheave a second time.

26. An amusement ride of the merry-go-round type, comprising the combination of a rotating car support, a cable guide on said support, an endless cable in said guide for rotating the support, a driving sheave, an idler sheave, the cable passing from the cable guide around the idler sheave, thence around the driving sheave, thence around the idler sheave again and thence around the driving sheave a second time, and a brake drum coaxial with the driving sheave.

27. An amusement ride comprising the combination of a car or train revolving about a central pivot, a drive therefor, a radially folding canopy normally lying in folded position between the car or train and the pivot and adapted to be interposed between the car or train and spectators, and means for connecting the car or train drive with the canopy moving means.

28. An amusement ride comprising the combination of a central axis, sweeps radiating therefrom, cars at the outer ends of the sweeps, an undulating trackway upon which the cars run, cable guides secured to the sweeps and undulating therewith, an endless cable encircling the ride in said guides, a sheave to which the cable is delivered in the plane of the sheave, and a second sheave from which the cable is returned to the guides in the plane of the two effective guides immediately adjacent the second sheave.

In testimony whereof I affix my signature.

HYLA F. MAYNES.